Patented June 28, 1938

2,122,180

UNITED STATES PATENT OFFICE 2,122,180

SYNTHETIC SPINELS

Ekbert Lederle, Ludwigshafen-on-the-Rhine, and Rudolf Brill, Heidelberg, Germany, assignors to I. G. Farbenindustrie Aktiengesellschaft, Frankfort-on-the-Main, Germany No Drawing. Application July 28, 1937, Serial No. 156,144. In Germany July 29, 1936

5 Claims. (Cl. 106—36.1)

The present invention relates to the preparation of synthetic spinels according to the well known process of Verneuil (see Ann. Chim. [3], 3, 20 [1904] and Ullmann, Enzyklopaedie der technischen Chemie, vol. 4, 127 [1929]), by fusing mixtures comprising zinc oxide and titanium dioxide.

When attempting to prepare spinels of the composition $Zn_2TiO_4$ from zinc oxide and titanium dioxide by the said process, it is very difficult to obtain products of the desired composition by reason of the great speed of vaporization of the zinc oxide at the temperatures necessary for the preparation.

We have now found that the said difficulties can be avoided by preheating before the fusing process the pulverulent mixture of zinc oxide and titanium dioxide or of compounds yielding the same when heated, the said preheating being effected at temperatures of between 500° and 1000° C. At the said temperatures the speed of vaporization of the zinc oxide is still very low, but the temperatures are sufficient to convert the mixture, which retains the form of a fine powder, into a state in which it is very suitable as an initial material for the preparation of large spinel crystals according to the Verneuil process, because in the said state it no longer exhibits the drawback of the zinc oxide to vaporize partially at high temperatures.

We have also found that by heating mixtures containing less zinc oxide than corresponds to the molecular ratio of 2 ZnO : 1 $TiO_2$, there are also obtained very good initial materials for the preparation of products similar to spinel, even when the molecular ratio is as low as from 0.9 to 1.0 ZnO : 1 $TiO_2$.

The composition of the masses may also be changed by replacing a part of the zinc oxide by magnesium oxide, for example up to about 70 per cent of the molecular weight of the zinc oxide, in mixtures corresponding to the composition 2 ZnO : 1 $TiO_2$. In the final product the magnesium then isomorphously replaces the zinc. In this case a mixture of zinc oxide, magnesium oxide and titanium dioxide may be subjected to the said treatment at temperatures of from 500° to 1000° C., or magnesium oxide or a substance yielding the same may be added to a zinc oxide-titanium dioxide mixture which has already been heat-treated in the said manner, the products in both cases being then further worked up according to the Verneuil process.

The following examples will further illustrate how the said invention may be carried out in practice, but the invention is not restricted to these examples.

Example 1

A pulverulent mixture of 500 grams of zinc oxide and 510 grams of titanium dioxide or 624 grams of $TiO_2.H_2O$ is heated for 2 hours at 850° C. The pulverulent product thus obtained is fused into pear-shaped bodies in known manner by the Verneuil process.

Example 2

A mixture of 200 grams of zinc oxide, 140 grams of magnesium oxide and 510 grams of titanium dioxide is heated for 3 hours at 900° C. The powder thus pretreated is fused in known manner by the Verneuil process.

Example 3

600 grams of titanium dioxide hydrate are suspended in a zinc sulphate solution having a zinc sulphate content corresponding to 450 grams of zinc oxide. By means of soda, zinc carbonate is precipitated on the said titanium dioxide hydrate. The mixture is filtered and the filter cake heated for 4 hours at 600° C. The powder is then further worked up as described above.

What we claim is:—

1. The process of producing synthetic spinels according to the known process of Verneuil by fusing mixtures of zinc oxide and titanium dioxide which comprises preheating mixtures which contain the said oxides in a molecular ratio of from 0.9 to 2 ZnO : 1 $TiO_2$, to temperatures between 500° and 1000° C. before fusing the mixtures.

2. The process of producing synthetic spinels according to the known process of Verneuil by fusing mixtures of zinc oxide and titanium dioxide which comprises preheating mixtures which contain the said oxides in a molecular ratio of from 0.9 to 2 ZnO : 1 $TiO_2$, at least one of the oxides being initially present in the form of compounds yielding the oxide when heated, to temperatures between 500° and 1000° C. before fusing the mixtures.

3. The process of producing synthetic spinels according to the known process of Verneuil by fusing mixtures of zinc oxide and titanium dioxide which comprises preheating mixtures which contain the said oxides in a molecular ratio of from 0.9 to 2 ZnO : 1 $TiO_2$, the titanium dioxide being present initially in the form of $TiO_2.H_2O$, to temperatures between 500° and 1000° C. before fusing the mixtures.

4. The process of producing synthetic spinels according to the known process of Verneuil by fusing mixtures of zinc oxide and titanium dioxide which comprises preheating mixtures which contain the said oxides in a molecular ratio of from 0.9 to 2 ZnO : 1 TiO$_2$, the zinc oxide being present initially in the form of zinc carbonate, to temperatures between 500° and 1000° C. before fusing the mixtures.

5. In the process as claimed in claim 1 replacing the zinc oxide in an amount of up to about 70 per cent of its molecular weight by magnesium oxide.

EKBERT LEDERLE.
RUDOLF BRILL.